United States Patent [19]
Aoki et al.

[11] Patent Number: 5,700,899
[45] Date of Patent: Dec. 23, 1997

[54] CURABLE SILICONE COMPOSITIONS

[75] Inventors: Shunji Aoki; Toshio Ohba; Yasuaki Hara; Kunio Itoh, all of Usui-gun, Japan

[73] Assignee: Shin-Etsu Chemical Co., Ltd., Tokyo, Japan

[21] Appl. No.: 695,525

[22] Filed: Aug. 12, 1996

Related U.S. Application Data

[63] Continuation of Ser. No. 490,449, Jun. 14, 1995, abandoned.

[30] Foreign Application Priority Data

Jun. 15, 1994 [JP] Japan ................. 6-156707

[51] Int. Cl.$^6$ ............................................. C08G 77/08
[52] U.S. Cl. ........................... 528/37; 528/12; 556/455; 556/460; 521/31
[58] Field of Search ................ 528/37, 12; 556/455, 556/460; 522/31

[56] References Cited

U.S. PATENT DOCUMENTS

| | | | |
|---|---|---|---|
| 2,508,196 | 5/1950 | Seidel et al. | 556/460 |
| 3,372,178 | 3/1968 | Wu | 556/455 |
| 3,629,359 | 12/1971 | Nitzsche et al. | 528/37 |
| 4,077,994 | 3/1978 | Davies et al. | 556/455 |
| 4,497,943 | 2/1985 | Takago et al. | 528/22 |
| 4,826,710 | 5/1989 | Buese | 427/387 |
| 5,298,589 | 3/1994 | Buese et al. | 528/21 |
| 5,330,836 | 7/1994 | Buese et al. | 428/405 |

OTHER PUBLICATIONS

Derwent Publications Abstract of JP 61 167 694, 29 Jul. 1986.

*Primary Examiner*—Margaret W. Glass
*Attorney, Agent, or Firm*—Millen, White, Zelano & Branigan, P.C.

[57] ABSTRACT

A curable silicone composition based on an organopolysiloxane having a cyclotrisiloxane structure quickly cures by brief heating or ultraviolet exposure. It further contains an acid, acid generator, base or base generator or an onium salt photo-initiator as a curing agent. The cured product has release property from adhesive substance which remains unchanged with the lapse of time and good mold release properties, and thus provides a lightly releasable cured film. The composition is widely used as adhesive tape backing agents, mold release agents, protective coating agents, water and oil repellent agents, and paint base.

11 Claims, No Drawings

CURABLE SILICONE COMPOSITIONS

This application is a continuation of application Ser. No. 08/490,449, filed Jun. 14, 1995 now abandoned.

BACKGROUND OF THE INVENTION

1. Field of the Invention

This invention relates to a novel curable silicone composition which quickly cures by brief heating or ultraviolet exposure. More particularly, it relates to such a curable silicone composition which can be widely used as backing agents of adhesive tape, release agents, protective coating agents, water and oil repellent agents, and paint base.

2. Prior Art

In general, curable silicone compositions include compositions of the condensation reaction type comprising an organopolysiloxane having a ≡SiOH group, an organopolysiloxane having a hydrolyzable group attached to a silicon atom or organosilane, and a curing promoter; compositions of the addition reaction type comprising an organopolysiloxane having a ≡SiH group, an organopolysiloxane having an alkenyl group attached to a silicon atom, and a platinum curing catalyst; and compositions of the heat vulcanization type using peroxide curing agents. They are widely used in a variety of applications.

In one typical application, for the purpose of preventing adhesion or bond between substrates such as paper, converted paper and plastic film and pressure-sensitive adhesives, silicone compositions which will cure upon exposure of ultraviolet lights and electron beams are applied to the substrate surface to form cured coatings thereon. This is generally known as release paper.

Known silicone compositions capable of forming releasable cured coatings which can be used as release paper include compositions which contain an alkenyl group-containing organopolysiloxane, a polyorganohydrosiloxane and a platinum catalyst and which rely on addition reaction and compositions which contain an epoxy group-containing organopolysiloxane and an onium salt photo-initiator and which rely on photo-cationic curing reaction (see JP-A 38350/1981).

The former silicone compositions relying on addition reaction have the problem that the release of the cured coating from adhesive substance lowers with the lapse of time since unreacted SiH groups are left in the cured coating. The latter silicone compositions relying on photo-cationic curing reaction have the problem that a strong force is required for release because of inclusion of epoxy groups. It is desired to overcome these problems.

SUMMARY OF THE INVENTION

An object of the invention is to provide a novel and improved curable silicone composition which will quickly cure by heating or ultraviolet exposure.

According to the invention, there is provided a curable silicone composition comprising an organopolysiloxane having a cyclotrisiloxane structure as a main component. An acid, acid generator, base or base generator is preferably blended in the composition as a curing agent. Alternatively, an onium salt photo-initiator is blended as a curing agent.

The composition quickly cures by heating or ultraviolet exposure for a short time. The cured product has release property from adhesive substance which remains stable after long-term storage at high temperature, and thus provides a releasable cured film which has good release from molds and is lightly releasable because of elimination of epoxy groups.

BEST MODE FOR CARRYING OUT THE INVENTION

According to the invention, an organopolysiloxane having a cyclotrisiloxane structure is used as a main component of a curable silicone composition. Preferred organopolysiloxanes have in a molecule at least two structural units represented by the following general formula (1):

$$R_a X_b SiO_{(4-a-b)/2} \quad (1)$$

wherein R is an organic group including a substituted or unsubstituted monovalent hydrocarbon group and an alkoxy group, X is a cyclotrisiloxane structure-containing group, and letters a and b are integers in the range: $0 \leq a \leq 2$, $1 \leq b \leq 3$, and $a+b \leq 3$. These organopolysiloxanes may be linear, branched or cyclic.

In formula (1), the hydrocarbon groups represented by R are preferably those groups having 1 to 10 carbon atoms, for example, alkyl groups such as methyl, ethyl, propyl isopropyl, butyl, isobutyl, tert-butyl, pentyl, neopentyl, hexyl, heptyl, octyl, nonyl and decyl; cycloalkyl groups such as cyclopentyl, cyclohexyl and cycloheptyl; alkenyl groups such as vinyl, allyl, propenyl, isopropenyl, butenyl, isobutenyl, hexenyl and cyclohexenyl; aryl groups such as phenyl, tolyl and xylyl; aralkyl groups such as benzyl, phenylethyl, phenylpropyl and methylbenzyl; and substituted ones of these groups wherein some or all of the hydrogen atoms each attached to a carbon atom are replaced by hydroxy groups, cyano groups, halogen atoms such as hydroxypropyl, cyanoethyl, chloromethyl, 2-bromoethyl, 3-chloropropyl, 3,3,3-trifluoropropyl, chlorophenyl, fluorophenyl and 3,3,4,4,5,5,6,6-nonafluorohexyl. The alkoxy groups represented by R are preferably those groups having 1 to 10, preferably 1 to 6 carbon atoms such as methoxy, ethoxy, propoxy, isopropoxy and butoxy.

X represents a cyclotrisiloxane structure which is preferably a group of the following formula (2):

(2)

wherein R' is a substituted or unsubstituted monovalent hydrocarbon group having 1 to 10 carbon atoms as mentioned above for R in formula (1) or trialkylsilyloxy groups such as trimethysilyloxy group, dimethylbutylsilyloxy group and tributylsililoxy group, and $R^1$ is a divalent hydrocarbon group or oxygen atom. The alkyl group in the trialkylsilyloxy group has 1 to 10 carbon atoms, preferably 1 to 6 carbon atoms. Exemplary hydrocarbon groups represented by $R^1$ are alkylene groups having 1 to 8 carbon atoms such as methylene, ethylene and propylene, cycloalkylene groups having 3 to 8 carbon atoms such as cyclohexylene, arylene groups having 6 to 8 carbon atoms such as phenylene, oxyalkylene groups having a formula of —$R^2O$— wherein $R^2$ is an alkylene group having 1 to 8 carbon atoms as exemplified above, and polyoxyalkylene groups having a formula of —$(R_2O)_n$—, wherein $R^2$ has the same meaning as above and n is an integer of 2 to 20.

The preferred substituent X has the following formula (3):

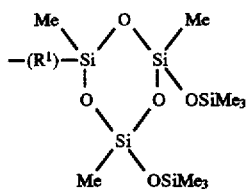
(3)

wherein Me is a methyl group and $R^1$ has the same meaning as above.

Illustrative examples of substituent X are given below. Note that Me is methyl.

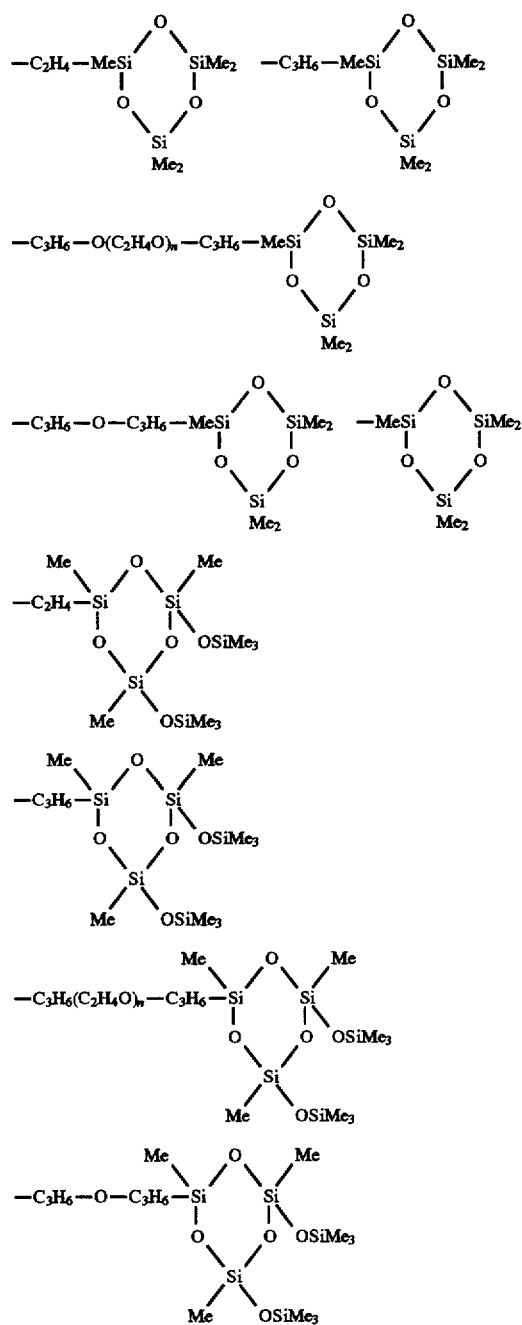

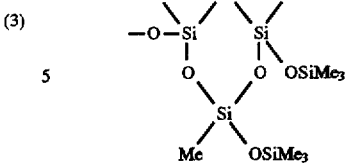

The organopolysiloxane containing a unit of formula (1) having a cyclotrisiloxane structure according to the invention may contain another unit, typically at least one unit selected from $R^3{}_3SiO_{1/2}$, $R^3{}_2SiO$, $R^3SiO_{3/2}$, and $SiO_2$ units wherein $R^3$ is the same group as defined for R.

In the organopolysiloxane according to the invention, the proportion of the siloxane unit of formula (1) having a cyclotrisiloxane structure relative to the entire siloxane units contained therein is not critical although it is preferably about 0.5 to 70 mol %, more preferably about 1 to 40 mol % for ease of synthesis. Curing would be insufficient with less than 0.5 mol % of the siloxane unit of formula (1) whereas organopolysiloxanes containing more than 70 mol % of the siloxane unit of formula (1) would be difficult to synthesize.

The organopolysiloxane having a cyclotrisiloxane structure according to the present invention preferably has the following average compositional formula (A):

$$R^3{}_iX_jSiO_{(4-i-j)/2} \qquad (A)$$

wherein $R^3$ and X are the same meaning as above, and i and j are numbers satisfying $0 \leq i \leq 1.999$, $0.005 \leq j \leq 2.100$ and $0.015 \leq i+j \leq 3.000$.

Examples of the organopolysiloxane are given below. In the following formulae, $R^3$ and X are the same meaning as above.

$$R^3{}_3SiO\text{-}[R^3XSiO]_L\text{-}[R^3{}_2SiO]_M\text{-}SiR^3{}_3$$

wherein letters L and M are integers (including 0) satisfying $2 \leq L \leq 2100$ and $2 \leq L+M \leq 3000$.

$$R^3{}_2XSiO\text{-}[R^3XSiO]_L\text{-}[R^3{}_2SiO]_M\text{-}SiR^3{}_2X$$

wherein letters L and M are integers (including 0) satisfying $0 \leq L \leq 2100$ and $1 \leq L+M \leq 3000$.

$$[R^3{}_3SiO_{1/2}]_P\text{-}[R^3XSiO]_Q\text{-}[R^3{}_2SiO]_R\text{-}[R^3SiO_{3/2}]_S$$

wherein letters P, Q, R and S are integers (including 0) satisfying $2 \leq Q \leq 2100$ and $3 \leq P+Q+R+S \leq 3000$.

$$\boxed{[R^3XSiO]_L\text{-}[R^3{}_2SiO]_M}$$

wherein letters L and M are integers (including 0) satisfying $2 \leq L \leq 5$ and $3 \leq L+M \leq 20$.

More embodied examples of the organopolysiloxane containing a unit of formula (1) having a cyclotrisiloxane structure are given below while they may be used alone or in admixture of two or more.

$$Me_3SiO\text{-}[MeXSiO]_2\text{-}[Me_2SiO]_8\text{-}SiMe_3$$

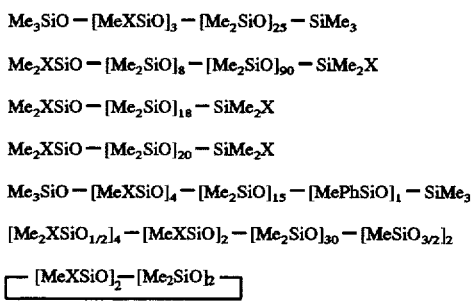

It is noted that Me is methyl, Ph is phenyl, and X is a group as defined by formula (2).

Preferably the organopolysiloxanes are oily at room temperature. Their viscosity is not critical although it is preferably in the range of about 10 to about 1,000,000 centipoise at 25° C., more preferably about 50 to about 10,000 centipoise at 25° C.

In addition to the main component in the form of an organopolysiloxane as defined above, the curable silicone composition of the invention generally contains a curing agent. Acids, acid generators, bases and base generators are preferably used as the curing agent.

Examples of the acid used herein include Bransted acids such as sulfuric acid, hydrochloric acid, methanesulfonic acid, para-toluenesulfonic acid, dodecylbenzenesulfonic acid, trifluoromethanesulfonic acid, acetic acid, and trifluoroacetic acid; and Lewis acids such as aluminum trichloride, boron trifluoride, titanium tetrachloride, iron (III) chloride, zinc chloride, tin chloride, trialkylaluminum, zinc octanoate, tin octanoate, dibutyltin dilaurate, aluminum (III) acetylacetonate, and dibutyltin dimethoxide. It is also possible to use thermally latent acid catalysts having a Bransted acid combined with a Lewis acid (see JP-A 320529/1993).

Use of an acid generator as the curing agent is effective for extending the pot life of the composition. Preferred acid generators are onium salt acid generators and onium salt photo-initiators. Exemplary onium salt photo-initiators include diaryl iodonium salts, triaryl sulfonium salts, monoaryl dialkyl sulfonium salts, triaryl selenonium salts, tetraaryl phosphonium salts, and aryl diazonium salts as represented by $(R^4)_2I^+X^-$, $(R^4)_3S^+X^-$, $(R^4)_1(R^5)_2S^+X^-$, $(R^4)_3Se^+X^-$, $(R^4)_4P^+X^-$, and $(R^4)N_2^+X^-$ wherein $R^4$ is an aryl group, $R^5$ is an alkyl group, and $X^-$ is an anion such as $CF_3SO_3^-$, $SbF_6^-$, $AsF_6^-$, $PF_6^-$, $BF_4^-$, $HSO_4^-$, $ClO_4^-$, and $Cl^-$. Also useful are triazine photo-acid generators, sulfonate photo-acid generators, and disulfone photo-acid generators.

Examples of the base include metal hydroxides such as lithium hydroxide, sodium hydroxide, and potassium hydroxide, alkyl metals such as butyllithium, metal alkoxide such as sodium methoxide and potassium methoxide, metal silanolates such as sodium silanolate, potasium silanolalate and lithium silanolate, primary, secondary and tertiary amines such as triethylamine, ethylene diamine, diethylene triamine, 1,8-diazabicyclo[5.4.0]undec-7-ene, and 1,4-diazabicyclo[2.2.2]octane, and phosphines such as triphenyl phosphine, tri(4-methoxyphenyl) phosphine, and tributyl phosphine.

The base generators include those having a group $C_6H_5CH_2OCONH-$.

From the standpoint of pot life, it is preferred to use onium salt photo-initiators and Lewis acids as the curing agent.

The amount of the curing agent added is preferably about 0.01 to about 30 parts, especially about 0.1 to about 20 parts by weight per 100 parts by weight of the main component. On this basis, less than 0.01 part of the curing agent would be ineffective for curing whereas more than 30 parts of the curing agent would adversely affect the physical properties of cured coatings or products.

The inventive composition is prepared by uniformly mixing predetermined amounts of the main component and the curing agent. If desired, other curable resins and various additives may be added as optional components. Examples of the other curable resins include epoxy resins capable of cationic polymerization, organopolysiloxanes having an epoxy group, organopolysiloxanes having a vinyl ether group, and acrylic resins capable of anionic polymerization. Exemplary additives include epoxy diluents, vinyl ether diluents, acrylic diluents, fillers, agents for enhancing adhesion to substrates, leveling agents, anti-static agents, defoaming agents, pigments, and dyes.

The inventive composition may be used by diluting with organic solvents.

The inventive composition may-be used by admitting into a mold to form a rubbery sheet although it is typically applied to a substrate to form a cured coating thereon. Exemplary substrates include paper substrates such as glassine paper, kraft paper, and clay coated paper; laminated paper such as polyethylene laminated wood-free paper and polyethylene laminated kraft paper; plastic films and sheets formed of synthetic resins such as polyesters, polypropylene, polyethylene, polyvinyl chloride, polytetrafluoroethylene, polycarbonates, and polyimides; metals such as aluminum and copper; and ceramics such as glass. In applying the inventive composition to such substrates, any desired one of conventional coating techniques such as roll coating, gravure coating, wire doctor coating, air knife coating and dipping may be used. The coating may have a thickness of about 0.1 µm to about 5 mm.

After being applied to substrates as mentioned above, the curable silicone composition of the invention is cured simply by exposing it to ultraviolet radiation if photo-acid generators are used as the curing agent or by heating if acids and bases are used as the curing agent.

For UV curing, any of mercury arc lamps, high-pressure mercury lamps, medium-pressure mercury lamps, low-pressure mercury lamps, and metal halide lamps may be used as a UV light source. When a high-pressure mercury lamp (80 W/cm) is used, for example, the coating may be cured by operating the lamp at a distance of 8 cm for about 0.01 second to 10 minutes.

In the case of heat curing, the coating may be heated in a hot air circulation drying oven at a temperature of about 70° to about 200° C. for about 1 to about 120 minutes.

There has been described a curable silicone composition mainly comprising an organopolysiloxane having a cyclotrisiloxane structure, which quickly cures by brief heating or ultraviolet exposure. The cured product has release property from adhesive substance which remains unchanged with the lapse of time and good mold release properties, and thus provides a releasable cured film which is lightly releasable. The composition can be widely used as backing agents of adhesive tape; release agents for rubber, plastics and ceramics; protective coating agents for metals and plastics; water and oil repellent agents for natural fibers, synthetic fibers and food packing; heat resistant, chemical resistant coatings; and paint bases as well as additives, printing plates, sealants, insulating materials, and electrically insulating coatings.

EXAMPLE

Examples of the present invention are given below by way of illustration and not by way of limitation. All parts are by weight.

Example 1

A processing liquid was prepared by mixing 100 parts of an organopolysiloxane having a cyclotrisiloxane structure of the following average compositional formula (4) with 5 parts of dodecylbenzenesulfonic acid.

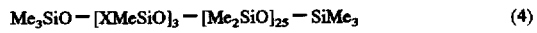  (4)

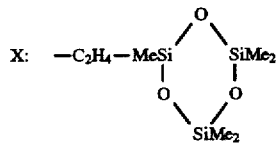

The processing liquid was admitted into an aluminum mold so as to form a sheet of 2 mm thick and heated in a hot air circulating dryer at 150° C. for 10 minutes, obtaining a rubbery sheet.

Separately, the processing liquid was applied to polyethylene laminated paper to a coverage of 2 g/m² by means of a wire bar coater, and heated in a hot air circulating dryer at 150° C. for 10 minutes, obtaining a flexible cured coating.

Example 2

A rubbery sheet was prepared by the same procedure as in Example 1 except that 5 parts of dibutyltin dimethoxide was used instead of dodecylbenzenesulfonic acid.

Example 3

A rubbery sheet was prepared by the same procedure as in Example 1 except that 2 parts of a saturated butanol solution of potassium hydroxide was used instead of 5 parts of dodecylbenzenesulfonic acid and the heating time was 5 minutes.

Example 4

A rubbery sheet was prepared by the same procedure as in Example 1 except that 5 parts of 1,8-diazabicyclo[5.4.0]-undec-7-ene was used instead of 5 parts of dodecylbenzenesulfonic acid and the heating time was 15 minutes.

Example 5

A rubbery sheet was prepared by the same procedure as in Example 1 except that 5 parts of tri(2,4-dimethoxyphenyl)phosphine was used instead of 5 parts of dodecylbenzenesulfonic acid and the heating time was 60 minutes.

Example 6

A processing liquid was prepared by mixing 100 parts of an organopolysiloxane having a cyclotrisilone structure of formula (4) with 2 parts of a diaryl iodonium salt photo-initiator and 20 parts of methyl isobutyl ketone.

The processing liquid was applied to polyethylene laminated paper to a coverage of 2 g/m² by means of a wire bar coater, and exposed to UV radiation from a 80-W/cm high-pressure mercury lamp at a distance of 8 cm for 2 seconds, obtaining a flexible cured coating.

Example 7

A flexible cured coating was prepared by the same procedure as in Example 6 except that 2 parts of benzoin triflate was used instead of 2 parts of the iodonium salt photo-initiator.

Example 8

A processing liquid was prepared by mixing 100 parts of an organopolysiloxane having a cyclotrisiloxane structure of the following average compositional formula (5) with 2 parts of a diaryl iodonium salt photo-initiator.

  (5)

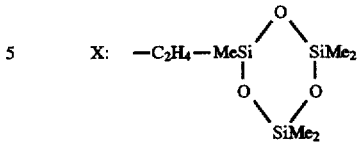

The processing liquid was applied to polyethylene laminated paper to a coverage of 2 g/m² by means of a wire bar coater, and exposed to UV radiation from a 80-W/cm high-pressure mercury lamp at a distance of 8 cm for 2 seconds, obtaining a flexible cured coating.

Example 9

A processing liquid was prepared by mixing 100 parts of an organopolysiloxane having a cyclotrisiloxane structure of the following average compositional formula (6) with 2 parts of a iodonium salt photo-initiator.

  (6)

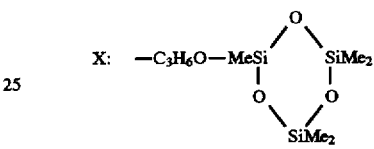

The processing liquid was applied to polyethylene laminated paper to a coverage of 2 g/m² by means of a wire bar coater, and exposed to UV radiation from a 80-W/cm high-pressure mercury lamp at a distance of 8 cm for 2 seconds, obtaining a flexible cured coating.

Comparative Example 1

A processing liquid was prepared by mixing 100 parts of an epoxy group-containing organoolysiloxane of the following average compositional formula (7) with 2 parts of a iodonium salt photo-initiator.

  (7)

E: β-(3,4-epoxycyclohexyl)ethyl

The processing liquid was applied to polyethylene laminated paper to a coverage of 2 g/m² by means of a wire bar coater, and exposed to UV radiation from a 80-W/cm high-pressure mercury lamp at a distance of 8 cm for 2 seconds, obtaining a flexible cured coating.

The cured coatings obtained in Examples 1–9 and Comparative Example 1 were measured for release force and residual bonding force by the following methods. The results are shown in Table 1.

Release force

An acrylic solvent type adhesive SK-801B (Soken Chemical K.K.) was applied to a surface of the cured coating of the silicone composition on the substrate and heated at 100° C. for 3 minutes. A sheet of wood-free paper having a weight of 64 g/m² was laid on the tackified surface. The sample was cut into a strip of 50 mm wide and aged at room temperature (24° C.) for 24 hours or at 70° C. for 48 hours. Using a tensile tester, the overlying paper sheet was peeled from the sample strip at an angle of 180° at a rate of 0.3 m/min. The force (g/50 mm) required for peeling was measured.

Residual adhesion rate

A polyester adhesive tape 31B (Nitto Denko Corporation) was laid on a surface of the cured coating of the silicone composition on the substrate. With a load of 20 g/cm² applied, the sample was aged at 70° C. for 20 hours. The aged tape was peeled from the silicone coated substrate and laid on a polyester film. Using a tensile tester, the tape was peeled from the polyester film at an angle of 180° at a rate of 0.3 m/min. The force (g/25 mm) required for peeling was measured. As a control, a polyester adhesive tape which had not been attached to the cured silicone coating was laid on a polyester film and the force (g/25 mm) required for peeling the tape from the polyester film was measured. The peeling force was expressed in percentage relative to the peeling force of the control.

TABLE 1

|  | Release force (g/50 mm) | | Residual adhesion |
|---|---|---|---|
|  | 20° C./24 hour | 70° C./48 hour | rate(%) |
| Example 1 | 55 | 65 | 99 |
| Example 6 | 33 | 42 | 98 |
| Example 8 | 62 | 80 | 99 |
| Example 9 | 45 | 53 | 95 |
| Comparison | 87 | 270 | 95 |

As seen from Table 1, the curable silicone compositions of the invention are fully separable from adhesive substance and lightly releasable.

Example 10

A processing liquid was prepared by mixing 100 parts of an organopolysiloxane having a cyclotrisiloxane structure of the following average compositional formula (8) with 5 parts of dodecylbenzenesulfonic acid.

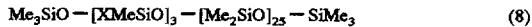
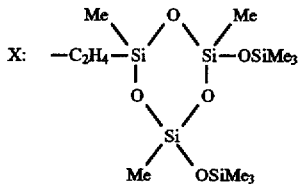

The processing liquid was admitted into an aluminum mold so as to form a sheet of 2 mm thick and heated in a hot air circulating dryer at 150° C. for 10 minutes, obtaining a rubbery sheet.

Separately, the processing liquid was applied to polyethylene laminated paper to a coverage of 2 g/m² by means of a wire bar coater, and heated in a hot air circulating dryer at 150° C. for 1 minute, obtaining a flexible cured coating.

Example 11

A rubbery sheet was prepared by the same procedure as in Example 10 except that 5 parts of dibutyltin dimethoxide was used instead of dodecylbenzenesulfonic acid.

Example 12

A rubbery sheet was prepared by the same procedure as in Example 10 except that 2 parts of a saturated butanol solution of potassium hydroxide was used instead of 5 parts of dodecylbenzenesulfonic acid.

Example 13

A rubbery sheet was prepared by the same procedure as in Example 10 except that 5 parts of 1,8-diazabicyclo[5.4.0]undec-7-ene was used instead of 5 parts of dodecylbenzenesulfonic acid.

Example 14

A processing liquid was prepared by mixing 100 parts of an organopolysiloxane having a cyclotrisiloxane structure of formula (8) with 2 parts of a diaryl iodonium salt photoinitiator and 50 parts of methyl isobutyl ketone.

The processing liquid was applied to polyethylene laminated paper to a coverage of 2 g/m² by means of a wire bar coater, and exposed to UV radiation from a 80-W/cm high-pressure mercury lamp at a distance of 8 cm by using a conveyer type ultraviolet radiation apparatus, obtaining a flexible cured coating. The conveyer rate was 30 m/minute.

Example 15

A flexible cure cured coating was prepared by the same procedure as in Example 14 except that an organopolysiloxane having a cyclotrisiloxane structure of the following average compositional formula (9) was used instead of the organopolysiloxane of formula (8).

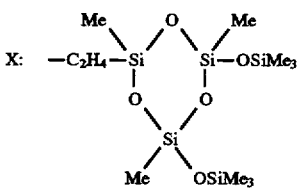

The cured coatings obtained in Examples 10–15 were measured for release force and residual bonding force by the above methods. The results are shown in Table 2.

TABLE 2

|  | Release force (g/50 mm) | | Residual adhesion |
|---|---|---|---|
|  | 20° C./24 hour | 70° C./48 hour | rate(%) |
| Example 10 | 45 | 65 | 99 |
| Example 14 | 30 | 40 | 99 |
| Example 15 | 18 | 27 | 97 |

Japanese Patent Application No. 156707/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A curable silicone composition consisting essentially of an organopolysiloxane having in a molecule at least two structural units represented by the following general formula (1):

wherein R is an organic group, letters a and b are integers in the range: $0 \leq a \leq 2$, $1 \leq b \leq 3$, and $a+b \leq 3$ and X is a cyclotrisiloxane structure-containing group of formula (2):

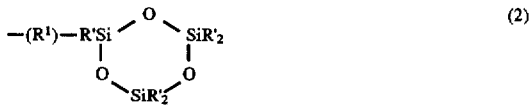

wherein R' is a monovalent hydrocarbon group or a trialkylsilyloxy group and $R^1$ is a divalent hydrocarbon group or an oxygen atom, and an onium salt photoinitiator as a curing agent for the organopolysiloxane, said silicone composition being curable by exposure to UV radiation to produce a product having release properties from an adhesive substance.

2. The curable silicone composition of claim 1, wherein said organopolysiloxane is oily at room temperature and has a viscosity of about 10 to about 1,000,000 centipoises at 25° C.

3. A releasable cured film, produced from a composition of claim 1.

4. A curable silicone composition comprising an organopolysiloxane having in a molecule at least two structural units represented by the following general formula (1):

   (1)

wherein R is an organic group, letters a and b are integers in the range: $0 \leq a \leq 2$, $1 \leq b \leq 3$, and $a+b \leq 3$ and X is a cyclotrisiloxane structure-containing group of formula (3):

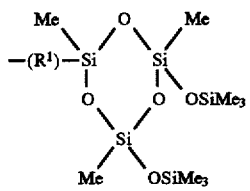   (3)

wherein Me is a methyl group and $R^1$ is a divalent hydrocarbon group or oxygen group.

5. The curable silicone composition of claim 4, wherein the curing agent is an onium salt photo-initiator.

6. The curable silicone composition of claim 4, wherein the curing agent is a Lewis acid.

7. The curable silicone composition of claim 4, wherein said organopolysiloxane is cured by heating or ultraviolet exposure.

8. The curable silicone composition of claim 4, whereby after curing the cured composition has release properties suitable for use as a backing agent of an adhesive tape.

9. The curable silicone composition of claim 4, whereby upon curing by heating or ultraviolet radiation the composition is crosslinked to produce a product having release properties.

10. A curable silicone composition comprising an organopolysiloxane having in a molecule at least two structural units represented by the following general formula (1):

   (1)

wherein R is an organic group, letters a and b are integers in the range: $0 \leq a \leq 2$, $1 \leq b \leq 3$, and $a+b \leq 3$ and X is a cyclotrisiloxane structure-containing group of formula (3):

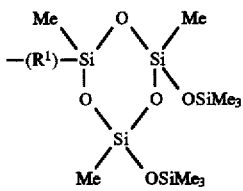   (3)

wherein Me is a methyl group and $R^1$ is a divalent hydrocarbon group or oxygen group and a curing agent for the organopolysiloxane, which curing agent is an acid, acid generator, base or base generator.

11. A curable silicone composition consisting of an organopolysiloxane having in a molecule at least two structural units represented by the following general formula (1):

   (1)

wherein R is an organic group, letters a and b are integers in the range: $0 \leq a \leq 2$, $1 \leq b \leq 3$, and $a+b \leq 3$ and X is a cyclotrisiloxane structure-containing group of formula (2):

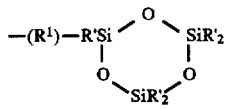   (2)

wherein R' is a monovalent hydrocarbon group or a trialkylsilyloxy group and $R^1$ is a divalent hydrocarbon group or an oxygen atom, and a curing agent for the organopolysiloxane, which curing agent is an acid, acid generator, base or base generator, whereby, when cured, the silicone composition has release properties.

* * * * *